United States Patent
Shane

(10) Patent No.: US 9,235,457 B2
(45) Date of Patent: Jan. 12, 2016

(54) PROACTIVELY COMMUNICATING INFORMATION BETWEEN PROCESSES THROUGH A MESSAGE REPOSITORY

(75) Inventor: Michael Shane, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1868 days.

(21) Appl. No.: 10/401,857

(22) Filed: Mar. 27, 2003

(65) Prior Publication Data

US 2004/0193569 A1 Sep. 30, 2004

(51) Int. Cl.
  G06F 7/00 (2006.01)
  G06F 17/00 (2006.01)
  G06F 9/54 (2006.01)
  G06F 17/30 (2006.01)

(52) U.S. Cl.
  CPC .......... *G06F 9/546* (2013.01); *G06F 17/30067* (2013.01)

(58) Field of Classification Search
  CPC .................................. G06F 17/30067
  USPC ............... 707/10, 102, 104.1, 200, 705, 792; 705/75; 709/206, 207, 224
  See application file for complete search history.

(56) References Cited

U.S. PATENT DOCUMENTS

| | | | | |
|---|---|---|---|---|
| 5,408,619 | A * | 4/1995 | Oran | 707/10 |
| 6,134,582 | A * | 10/2000 | Kennedy | 709/206 |
| 6,199,052 | B1 * | 3/2001 | Mitty et al. | 705/75 |
| 6,233,588 | B1 * | 5/2001 | Marchoili et al. | 707/200 |
| 6,401,098 | B1 * | 6/2002 | Moulin | 707/102 |
| 6,405,191 | B1 | 6/2002 | Bhatt et al. | |
| 6,425,006 | B1 * | 7/2002 | Chari et al. | 709/224 |
| 6,493,755 | B1 * | 12/2002 | Hansen et al. | 709/224 |
| 6,629,106 | B1 * | 9/2003 | Narayanaswamy et al. | 707/104.1 |
| 6,732,181 | B2 * | 5/2004 | Lim et al. | 709/229 |
| 2003/0005067 | A1 * | 1/2003 | Martin et al. | 709/207 |
| 2003/0005109 | A1 * | 1/2003 | Kambhammettu et al. | 709/224 |

OTHER PUBLICATIONS

Oracle Corporation, "Oracl9i Database Concepts, Release 2 (9.2), Part No. A96524-01," 2002, http://lbdwww.epfl.ch/f/teaching/courses/oracle9i/server.920/a96524/c07dstpr, printed Apr. 28, 2003, pp. 1-7.

* cited by examiner

*Primary Examiner* — Usmann Saeed
*Assistant Examiner* — Paul Kim
(74) *Attorney, Agent, or Firm* — Hickman Palermo Becker Bingham LLP

(57) ABSTRACT

A method and apparatus for proactively communicating information between processes through a message repository is provided. To communicate with other processes, a process may post a message to a message repository. Other processes may, at regular or irregular intervals, search the message repository for new messages that have been posted to the repository since the last search, and retrieve those new messages. Processes may post and retrieve messages relative to the message repository by invoking methods provided by an application programming interface (API). By posting a message to the message repository, a particular process can inform other interested processes proactively of actions that the particular process has taken, is taking, or will take. By retrieving messages from the message repository, a process can determine what actions other processes have taken, are taking, or will take, and adjust accordingly.

36 Claims, 3 Drawing Sheets

200

202
A FIRST PROCESS, WHICH IS SEPARATE FROM A MESSAGE DATABASE SERVER, CAUSES THE MESSAGE DATABASE SERVER TO STORE, IN A MESSAGE DATABASE, A MESSAGE THAT EXPLICITLY IDENTIFIES AN ACTION THAT THE FIRST PROCESS HAS PERFORMED, IS PERFORMING, OR WILL PERFORM

204
A SECOND PROCESS, WHICH IS SEPARATE FROM THE MESSAGE DATABASE SERVER AND THE FIRST PROCESS, CAUSES THE MESSAGE DATABASE SERVER TO RETRIEVE THE MESSAGE FROM THE MESSAGE DATABASE

206
THE SECOND PROCESS PERFORMS A RESPONSIVE ACTION THAT IS BASED ON THE ACTION EXPLICITLY IDENTIFIED BY THE MESSAGE

PROACTIVELY COMMUNICATING INFORMATION BETWEEN PROCESSES THROUGH A MESSAGE REPOSITORY

FIELD OF THE INVENTION

The present invention relates to interprocess communication, and in particular, to proactively communicating information between processes through a message repository.

BACKGROUND OF THE INVENTION

Sometimes, actions performed by one process may impact one or more other concurrently executing processes. For example, a first process may generate data and write the data into a buffer. A second process might concurrently read data from the buffer, removing data from the buffer as the data is read. As long as the second process reads and removes data from the buffer at least as rapidly as the first process writes data to the buffer, the buffer will not overflow. However, the second process might shut down. If the first process is not aware that the second process has shut down, then the first process might continue to write data to the buffer, eventually causing the buffer to overflow.

Because actions performed by one process may impact one or more other processes, it is beneficial for such processes to be able to communicate automatically with each other. If processes execute in connection with the same operating system, then the processes may invoke interprocess communication methods provided by the operating system in order to exchange messages with each other.

However, each process will often execute in connection with a different operating system. Even if each such operating system provides interprocess communication methods, an interprocess communication method provided by one operating system might not be compatible with an interprocess communication method provided by another operating system.

Under some approaches, in order for a first process to receive each message that is sent from a second process, the first process is configured to listen continuously for messages from the second process. When a first process is configured to continuously listen for messages from a second process, the first process can be said to be "tightly coupled" to the second process. Tight coupling between processes increases the processing overhead involved in interprocess communication.

Under some approaches, in order for a particular process to send a message to multiple other processes, the particular process sends the message to each of the other processes separately. Under such approaches, the particular process needs to know the identity of each message recipient. If there are many message recipients, then many messages will be sent. Too many messages can overwhelm limited communication resources.

Additionally, under current approaches, messages relating to an action performed by a process are generated only after the process has performed the action. In systems that use monitoring agents, a significant amount of time may pass before a monitoring agent detects that a process has performed an action. A significant amount of time may pass before the monitoring agent generates a corresponding message to alert other processes about the action. By the time the action has been performed, there may be little or no time remaining for such other processes to prepare for or respond to the action appropriately and effectively. At any given moment, computing resources may be allocated to the performance of one or more tasks. Without receiving sufficient advanced notice of some actions, processes might not have enough time to re-allocate enough resources to handle the action efficiently. When processes can only attempt to judge the impact of other processes' performed actions based on limited information gathered reactively by a monitoring agent, which may be able to determine only superficial information about the actions, the processes may be hindered by the need to evaluate the meaning of the actions. Sometimes, only the process that performed the actions possesses sufficient information concerning the full meaning and scope of the actions.

These are some of the problems that attend past approaches to interprocess communication. Because of these problems, past approaches to interprocess communication leave much to be desired. Because interprocess communication can significantly benefit systems in which the actions of one process impact one or more other processes, a technique for interprocess communication that overcomes these problems is needed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
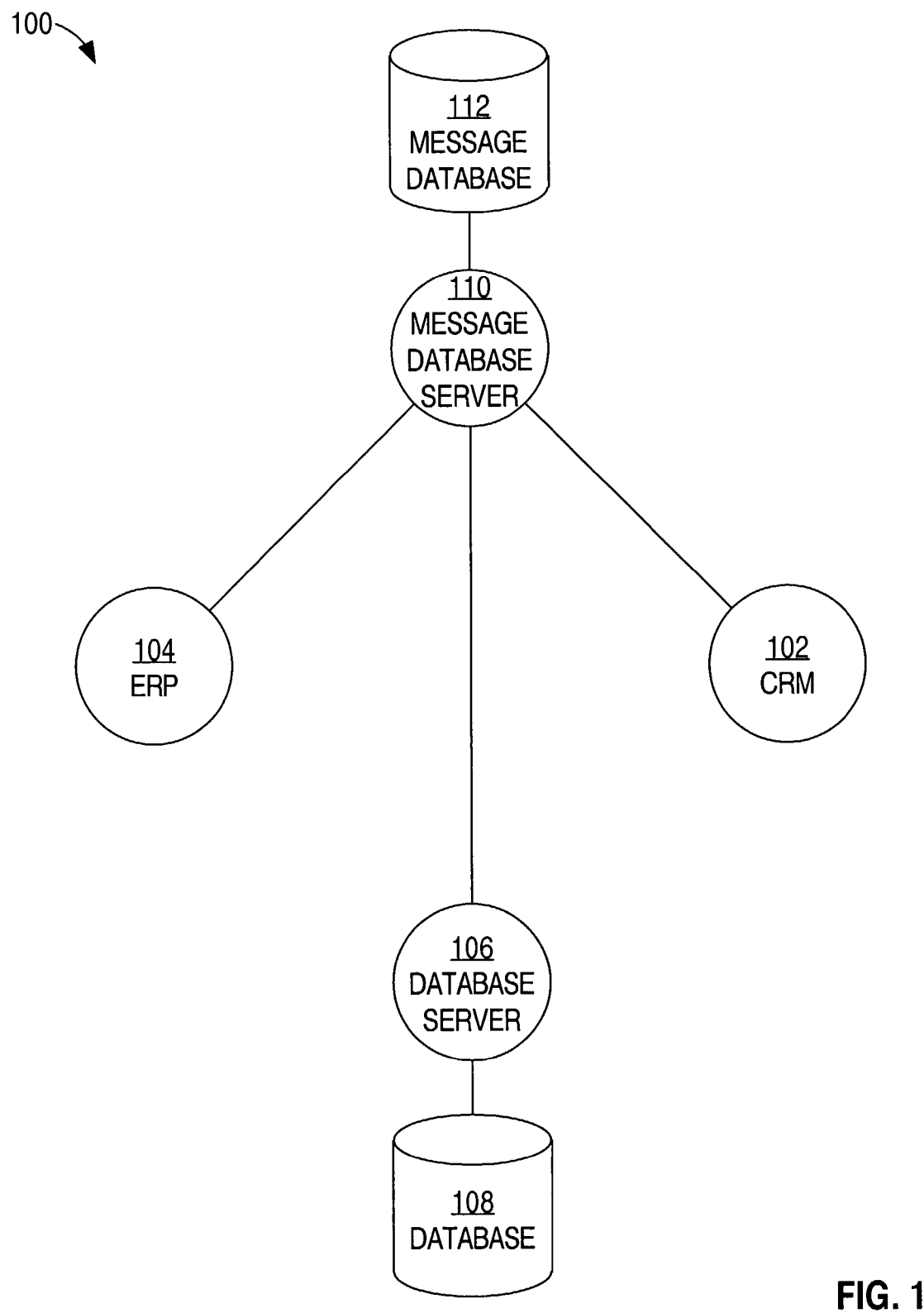
FIG. 1 is a block diagram that illustrates a system, according to an embodiment of the present invention, in which interprocess communication is achieved by writing messages to and reading messages from a message repository.

A method and apparatus for proactively communicating information between processes through a message repository is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

To communicate with other processes, a process may post a message to a message repository. Other processes may, at regular or irregular intervals, search the message repository for new messages that have been posted to the repository since the last search, and retrieve those new messages. Processes may post and retrieve messages relative to the message repository by invoking methods provided by an application programming interface (API). By posting a message to the message repository, a particular process can inform other interested processes proactively of actions that the particular process has taken, is taking, or will take. By retrieving messages from the message repository, a process can determine what actions other processes have taken, are taking, or will take, and adjust accordingly.

The API that provides the interprocess communication methods may provide such methods through a standard interface that does not vary between operating systems. Although a particular implementation of the methods provided by the API may be customized for a particular operating system, the syntax used to invoke the methods and the functionality provided by the methods needs not depend on the implementation. Applications may be programmed to post and retrieve messages relative to the repository by invoking standard API methods, so that application programmers do not need to account for differences between operating systems.

Because a process may post a message to the message repository rather than sending the message directly to an intended recipient, the intended recipient does not need to listen continuously for messages. Instead, a recipient process may search the message repository at regular or irregular intervals and retrieve any new messages that may be of interest. Thus, the processes need not be tightly coupled, but may be "loosely coupled" instead. By eliminating the need for processes to listen continuously, fewer processing resources may be used, freeing those resources for other purposes.

Additionally, by posting a message to the message repository, a process does not need to identify any intended message recipients. A process may send just one message that may be retrieved by any number of other interested processes. A process does not even need to know of the existence of any other processes that may be interested in the message. As fewer messages are sent, fewer communication resources are used, freeing those resources for other purposes.

Furthermore, by proactively posting a message relating to an action before the action has been performed, a process that will perform the action can provide sufficient time for other processes to efficiently and effectively prepare for and respond to the action. The process that will perform the action usually possesses the best information on how soon a message should be posted before the action is performed. Thus, other processes are provided with enough time to re-allocate resources needed to handle a response to the action. As the process that possesses the best information on the full scope and meaning of an action to be performed, the process that is to perform the action may proactively post a message that conveys sufficient information for other processes to properly and completely respond to the action. Thus, other processes are not forced to spend time evaluating the scope of the performing process' action. The systems described herein may be viewed as a proactive "tell" communication architecture that provides numerous advantages over the reactive "watch" communication architecture of past approaches.

FIG. 1 is a block diagram that illustrates a system 100, according to an embodiment of the present invention, in which interprocess communication is achieved by writing and reading messages to and from a message repository. System 100 comprises software processes including a customer relationship management process ("CRM") 102, an enterprise resource planning process ("ERP") 104, a database server 106, and a message database server 110. System 100 further comprises databases including a database 108 and a message database 112. The system shown is just one of many possible different configurations. Other embodiments may comprise fewer or more system components than those illustrated. For example, other embodiments may comprise other software processes instead of, or in addition to, CRM 102, ERP 104, and database server 106.

CRM 102, ERP 104, database server 106, and message database server 110 may be executed on the same computer or on different computers that are connected to a local area network (LAN), wide area network (WAN), or interconnected internetworks. Database 108 may be stored on the same computer that executes database server 106, or on a different computer. Message database 112 may be stored on the same computer that executes message database server 110, or on a different computer.

Each of CRM 102, ERP 104, and database server 106 is coupled communicatively to message database server 110. Thus, CRM 102, ERP 104, and database server 106 may send data to, and receive data from, message database server 110. Database 108 is coupled communicatively to database server 106. Thus, database server 106 may write data to, and read data from, database 108. Message database server 110 is coupled communicatively to message database 112. Thus, message database server 110 may write data to, and read data from, message database 112.

According to one embodiment, each of CRM 102, ERP 104, and database server 106 can invoke methods that are provided by a standard API. When invoked, one method provided by the standard API instructs message database server 110 to write specified data to message database 112. When invoked, another method provided by the standard API instructs message database server 110 to read and return, from message database 112, data that matches specified criteria. The same method may be invoked by any of CRM 102, ERP 104, and database server 106 to achieve the same functionality, even though each of CRM 102, ERP 104, and database server 106 may execute in connection with different operating systems. While the specific implementation of the API methods may vary, the syntax and parameters accepted by the API methods are operating system independent. According to one embodiment, message database 112 contains only data that has been stored as a result of the invocation of a method provided by an API as described above. Thus, according to one embodiment, message database 112 is dedicated to storing messages of the kind described herein.

By invoking a standard API "post" method, any of CRM 102, ERP 104, and database server 106 can cause message database server 110 to store, in message database 112, a message that explicitly identifies an action that the invoking process has performed, is performing, or will perform. By invoking a standard API "retrieve" method, any of CRM 102, ERP 104, and database server 106 can cause message database server 110 to retrieve, from message database 112, one or more messages that have been posted by other processes.

Thus, a process may inform other processes proactively of actions that may impact the other processes. Upon discovering such actions, another process may adjust or reconfigure based on the actions. Because a process may post a message concerning an action that the process will take in the future, other processes may adjust based on the action more quickly than if the other processes were able to discover the action only after the occurrence of the action.

It should be noted that processes that cause messages to be posted to and retrieved from message database 112 may be separate from message database server 110. For example, each of CRM 102, ERP 104, and database server 106 is separate from message database server 110.

It also should be noted that messages posted to and retrieved from message database 112 may concern actions that do not involve message database 112 or message database server 110. For example, ERP 104 may post a message that indicates that ERP 104 will add fifty records to database 108. While such an action affects database server 106 and database 108, such an action does not involve message database server 110 or message database 112, as neither message database server 110 nor message database 112 is a source or target of the action.

Message database 112 serves as a message repository. According to an alternative embodiment, the message repository may be a data structure other than a database. For example, the messages described above may be stored in a flat file instead of a database. While, in one embodiment, message database 112 is centralized, in an alternative embodiment, message database 112 may be distributed among several different computers and/or storage media.

Figure 2:
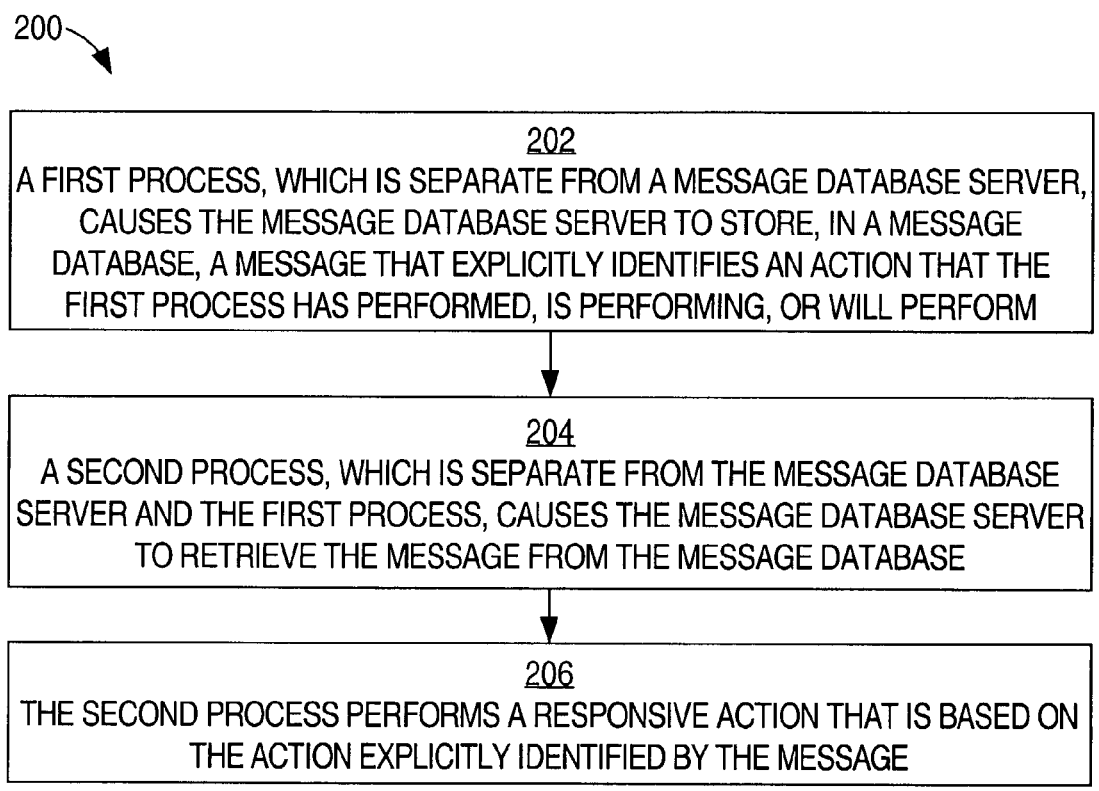
FIG. 2 is a block diagram that illustrates a technique, according to an embodiment of the present invention, for proactively communicating messages between processes through a message repository.

Proactively Communicating Information Between Processed Through a Message Repository FIG. 2 is a block diagram that illustrates a technique 200, according to an embodiment of the present invention, for proactively communicating messages between processes through a message repository. Technique 200 may be performed, for example, by CRM 102 and ERP 104, CRM 102 and database server 106, or ERP 104 and database server 106.

In block 202, a first process causes a database server to store, in a message database, a message that explicitly identifies an action that the first process has performed, is performing, or will perform. For example, ERP 104, by invoking a "post" method of an API, may cause message database server 110 to store, in message database 112, a message that indicates that ERP 104 will add fifty records to database 108.

In block 204, a second process causes the database server to retrieve the message from the message database. For example, database server 106, by invoking a "retrieve" method of an API, may cause message database server 110 to retrieve, from message database 112, the message that indicates that ERP 104 will add fifty records to a particular table in database 108. As input, the retrieve method may receive one or more parameters that indicate a set of criteria. Message database server 112 may filter out messages that do not satisfy the criteria and return only messages that satisfy the criteria.

In block 206, the second process performs a responsive action based on the action. For example, in response to determining from the message that ERP 104 will add fifty records to the particular table in database 108, database server 106 may allocate space in a database 108 for at least fifty additional records of the type stored in the particular table if such space has not already been allocated.

The responsive action may vary based on the action described in the message. For example, depending on the action, the second process may adjust Random Access Memory (RAM) buffers, adjust its own configuration, adjust the priority of tasks that it is currently performing, adjust an amount of allocated disk space, generate and send customized instructions to the Central Processing Unit (CPU), and/or display a message to a user. The second processes may, additionally or alternatively, perform other responsive actions.

The messages posted to message database 112 may indicate the date and time at which they were posted. In other words, each record in message database 112 may contain a timestamp. In one embodiment, when message database server 110 receives a command from a particular process to read and return messages from message database 112, message database server 110 searches for and returns only messages that have timestamps that indicate that those messages were posted since the last time that message database server returned messages to the particular process. According to one embodiment, for each process that accesses message database 112, message database server 110 maintains a record that indicates the last time that the process read message database 112, and uses the record to determine which messages were posted since the last time that the process read message database 112.

When a process invokes a "post" method of an API, the process may specify one or more parameters. According to one embodiment, a "post" command takes the form of "post_message(source, action_message, target, timestamp)." For example, the source program code on which ERP 104 is based may contain an instruction such as "post_message(ERP104, 'add 50 records', database 108, 'Jan. 15, 2002 11:02 pm')." The parameters indicate that ERP 104 will add 50 records to database 108 effective as of Jan. 15, 2003, at 11:02 pm.

Upon receiving the command sent by the API's implementation of the "post_message" method, message database server 110 adds a record to message database 112. Records in message database 112 may contain an attribute for each parameter that may be specified in the "post_message" method. For example, each record in message database 112 may contain a separate attribute for each of a source, an action, a target, and a timestamp. The source attribute may identify the process that caused the record to be added to message database 112.

The target parameter is optional in the "post_message" method. For example, the source program code on which database server 106 is based may contain an instruction such as "post_message(database_server106, 'shut down', 'Jan. 15, 2002 11:02 pm')." The parameters indicate that database server 106 will shut down effective as of Jan. 15, 2003, at 11:02 pm. The message does not need to indicate expressly that the target of the action is database server 106. Where a message expresses no target, it may be implied that the expressed source is also the target of the expressed action. The target may be a process or data structure upon which the expressed action has been performed, is being performed, or will be performed.

When a process invokes a "retrieve" method of an API, the process may specify one or more parameters. According to one embodiment, a "retrieve" command takes the form of "retrieve_messages(source, target)." For example, the source program code on which database server 106 is based may contain an instruction such as "retrieve_messages(ERP104, database106)." The parameters indicate that message database server 110 should find and return only messages posted by ERP 104 since the last time that database 106 caused message database server 110 to find and return messages posted by ERP 104.

The target parameter is optional in the "retrieve_messages" method. For example, the source program code on which database server 106 is based may contain an instruction such as "retrieve_messages(database_server106)." The parameters indicate that that message database server 110 should find and return all messages that have not yet been returned to database server 106. Thus, a process may search for new messages generally, or only for new messages that were posted by a specified source.

The action parameter may specify a quantity. For example, the action "add 50 records" specifies the quantity "50." A processes that receives a message that contains an action that specifies a quantity may perform a responsive action that is based on the specified quantity. For example, if database server 106 receives a message that specified that ERP 104 will add fifty records to a particular table in database 108, then database server 106 may allocate space in database 108 for at least fifty records, rather than twenty or one hundred.

The responsive action taken in response to an action specified in a message may comprise displaying a notification that is based on the action specified in the message. For example, in response to receiving a message that indicates that database server 106 will shut down at a particular time, ERP 104 may display, on a monitor that is connected to a computer on which ERP 104 executes, a notification that informs a user that database server 106 will shut down at the particular time. After viewing the notification, the user may take appropriate action.

According to one embodiment, in addition to the information described above, a message may comprise security information. In one embodiment, a process that generates a message encrypts all or a portion of the message with a public key that is associated with one or more processes for which the message is intended. Upon receiving a message, a recipient process may decrypt the encrypted portion with a private key that is associated with the recipient process. The private key is not known to processes other than the processes for which the message is intended.

Hardware Overview

Figure 3:
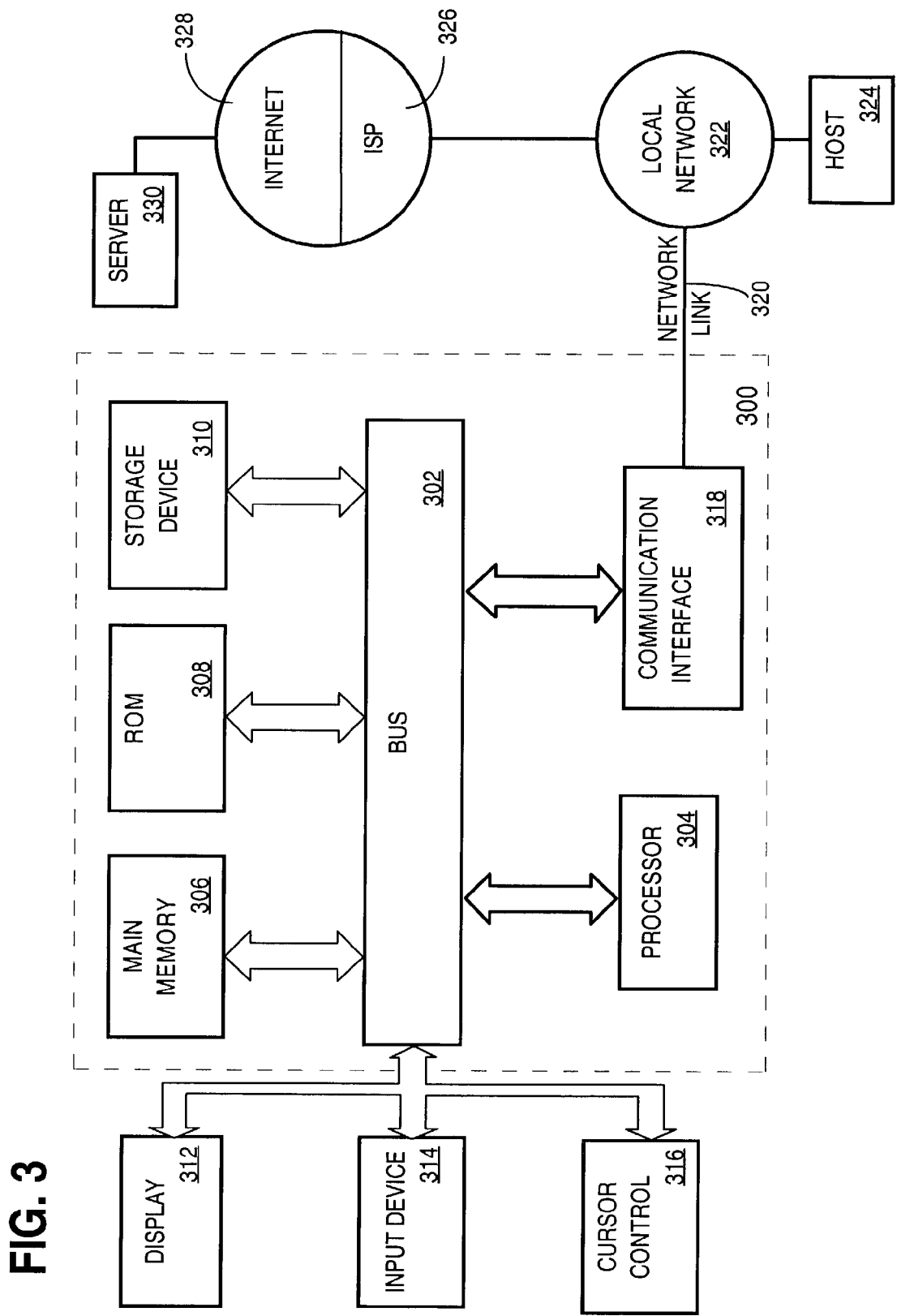
FIG. 3 is a block diagram that illustrates a computer system 300 upon which an embodiment of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of interprocess communication, the method comprising:
   a first process causing a database server to store, in a message database, a message whose content explicitly identifies an action that said first process will perform;
   said first process performing said action after causing said database server to store, in said message database, said message;
   a second process causing said database server to retrieve said message from said message database;
   wherein said second process performs a responsive action specified by the content of said message;
   wherein said first process is separate from said second process;
   wherein said first process and said second process are separate from said database server;
   wherein said action does not involve said message database;
   wherein said first process and said second process execute computer programs on one or more computing devices; and
   wherein said first process is not said action.

2. One or more non-transitory computer-readable media storing one or more sequences of instructions which, when executed by one or more processors, cause the one or more processors to perform a first process causing a database server to store, in a message database, a message whose content explicitly identifies an action that said first process will perform;
   said first process performing said action after causing said database server to store, in said message database, said message;
   a second process causing said database server to retrieve said message from said message database;
   wherein said second process performs a responsive action specified by the content of said message;
   wherein said first process is separate from said second process;
   wherein said first process and said second process are separate from said database server;
   wherein said action does not involve said message database;
   wherein said first process and said second process execute computer programs on one or more computing devices; and
   wherein said first process is not said action.

3. A method of interprocess communication, the method comprising:
   a first process storing, in a message database, a message whose content explicitly identifies an action;
   a second process retrieving said message from said message database;
   wherein said second process performs a responsive action specified by the content of said message;
   wherein said first process is separate from said second process; wherein said action does not involve said message database;
   wherein said first process and said second process execute computer programs on one or more computing devices;
   wherein said first process is not said action; and
   wherein said action is an action that is selected from a group consisting of:
      an action that said first process will perform after said message is stored; and
      an action that said first process is performing as said message is stored.

4. One or more non-transitory computer-readable media storing one or more sequences of instructions which, when executed by one or more processors, cause the one or more processors to perform:
   a first process storing, in a message database, a message whose content explicitly identifies an action;
   a second process retrieving said message from said message database;
   wherein said second process performs a responsive action specified by the content of said message;
   wherein said first process is separate from said second process;
   wherein said action does not involve said message database;
   wherein said first process and said second process execute computer programs on one or more computing devices;
   wherein said first process is not said action; and
   wherein said action is an action that is selected from a group consisting of:
      an action that said first process will perform after said message is stored; and an action that said first process is performing as said message is stored.

5. The method of claim 3, wherein said message contains a timestamp.

6. The method of claim 3, wherein said message identifies said first process.

7. The method of claim 3, wherein said message identifies a target on which said action has been performed, is being performed, or will be performed.

8. The method of claim 3, further comprising said second process periodically retrieving one or more messages from said message database.

9. The method of claim 3, wherein said action specifies a quantity.

10. The method of claim 3, further comprising said second process displaying a notification based on said action.

11. The method of claim 3, wherein said first process storing said message comprises:

said first process invoking a routine of an application programming interface;
said routine receiving said message as input; and said routine causing storing said message in said message database.

12. The method of claim 3, wherein said second process retrieving said message comprises:
said second process invoking a routine of an application programming interface; and
said routine causing retrieving, from said message database, messages that have not yet been retrieved by said second process.

13. The method of claim 3, wherein:
said first process storing said message comprises:
said first process invoking a first routine of an application programming interface,
said first routine receiving said message as input, and
said first routine causing storing said message in said message database;
said second process retrieving said message comprises:
said second process invoking a second routine of said application programming interface, and
said second routine causing retrieving, from said message database, messages that have not yet been retrieved by said second process;
said first process executes in connection with a first operating system; and
said second process executes in connection with a second operating system that differs from said first operating system.

14. The method of claim 3, further comprising:
determining whether said second process has received one or more messages that are stored in said message database; and
providing, to said second process, one or more messages that said second process has not yet received.

15. The method of claim 3, further comprising:
updating information that indicates, for each particular process of a plurality of processes, which messages that said particular process has not yet received.

16. The method of claim 3, wherein said action has not yet been performed by said first process.

17. The method of claim 3, further comprising:
said first process encrypting at least a portion of said message with a public key that is associated with said second process.

18. The method of claim 3, wherein the message does not express results produced by the action.

19. The method of claim 3, wherein said responsive action performed by said second process comprises at least one of:
allocating space in a database;
adjusting one or more Random Access Memory (RAM) buffers;
adjusting configuration of said second process;
adjusting priority of tasks performed by said second process;
adjusting an amount of allocated disk space; and
generating and sending customized instructions to a CPU.

20. The method of claim 3 wherein said responsive action alters configuration or operation of one or more (a) non-display devices, or (b) processes.

21. The one or more non-transitory computer-readable media of claim 4, wherein said message contains a timestamp.

22. The one or more non-transitory computer-readable media of claim 4, wherein said message identifies said first process.

23. The one or more non-transitory computer-readable media of claim 4, wherein said message identifies a target on which said action has been performed, is being performed, or will be performed.

24. The one or more non-transitory computer-readable media of claim 4, wherein the one or more sequences of instructions comprise instructions which, when executed by the one or more processors, cause the one or more processors to perform said second process periodically retrieving one or more messages from said message database.

25. The one or more non-transitory computer-readable media of claim 4, wherein said action specifies a quantity.

26. The one or more non-transitory computer-readable media of claim 4, wherein the one or more sequences of instructions comprise instructions which, when executed by the one or more processors, cause the one or more processors to perform said second process displaying a notification based on said action.

27. The one or more non-transitory computer-readable media of claim 4 wherein
said first process storing said message includes:
said first process invoking a routine of an application programming interface;
said routine receiving said message as input; and
said routine causing storing said message in said message database.

28. The one or more non-transitory computer-readable media of claim 4, wherein said second process retrieving said message includes:
said second process invoking a routine of an application programming interface; and
said routine causing retrieving, from said message database, messages that have not yet been retrieved by said second process.

29. The one or more non-transitory computer-readable media of claim 4:
wherein said first process storing said message includes:
said first process invoking a first routine of an application programming interface,
said first routine receiving said message as input, and
said first routine causing storing said message in said message database;
wherein said second process retrieving said message includes:
said second process invoking a second routine of said application programming interface, and
said second routine causing retrieving, from said message database, messages that have not yet been retrieved by said second process;
said first process executes in connection with a first operating system; and
said second process executes in connection with a second operating system that differs from said first operating system.

30. The one or more non-transitory computer-readable media of claim 4, wherein the one or more sequences of instructions comprise instructions which, when executed by the one or more processors, cause:
determining whether said second process has received one or more messages that are stored in said message database; and
providing, to said second process, one or more messages that said second process has not yet received.

31. The one or more non-transitory computer-readable media of claim 4, wherein the one or more sequences of instructions comprise instructions which, when executed by the one or more processors, cause:

updating information that indicates, for each particular process of a plurality of processes, which messages that said particular process has not yet received.

32. The one or more non-transitory computer-readable media of claim 4, wherein said action has not yet been performed by said first process.

33. The one or more non-transitory computer-readable media of claim 4, wherein the one or more sequences of instructions comprise instructions which, when executed by the one or more processors, cause:
   said first process encrypting at least a portion of said message with a public key that is associated with said second process.

34. The one or more non-transitory computer-readable media of claim 4, wherein the message does not express results produced by the action.

35. The one or more non-transitory computer-readable media of claim 4, wherein said responsive action performed by said second process comprises at least one of:
   allocating space in a database;
   adjusting one or more Random Access Memory (RAM) buffers;
   adjusting configuration of said second process;
   adjusting priority of tasks performed by said second process;
   adjusting an amount of allocated disk space; and
   generating and sending customized instructions to a CPU.

36. The one or more non-transitory computer-readable media of claim 4 wherein said responsive action alters configuration or operation of one or more (a) non-display devices, or (b) processes.

* * * * *